(No Model.)
T. MEYER.
ROTARY HARROW ATTACHMENT FOR WHEELED CULTIVATORS.
No. 370,803. Patented Oct. 4, 1887.
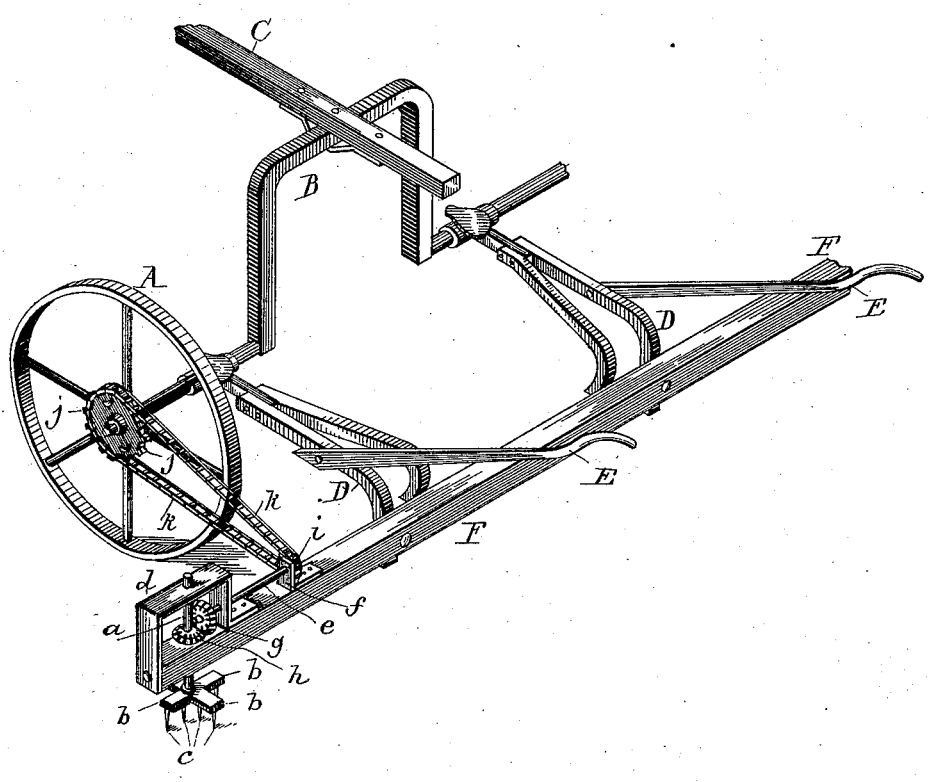

UNITED STATES PATENT OFFICE.

THEODORE MEYER, OF HICKORY GROVE, IOWA.

ROTARY-HARROW ATTACHMENT FOR WHEELED CULTIVATORS.

SPECIFICATION forming part of Letters Patent No. 370,803, dated October 4, 1887.

Application filed August 18, 1887. Serial No. 247,306. (No model.)

*To all whom it may concern:*

Be it known that I, THEODORE MEYER, a citizen of the United States, residing at Hickory Grove township, in the county of Scott and State of Iowa, have invented a new and useful Rotary-Harrow Attachment for Wheeled Cultivators, of which the following is a specification.

My invention relates to improvements in a rotary-harrow attachment for wheeled cultivators, wherein vertical shafts having arms and teeth attached to the lower end, in conjunction with beveled gearing, are rotated through power derived from the cultivator-wheels and transmitted by means of endless chains or belts.

The object of my improvement is to provide a rotary harrow to loosen the earth on corn-rows or other plant-rows before the plants come through, although the harrow may be used, if desired, to cultivate between the rows. I attain these objects by the mechanism illustrated in the accompanying drawing, in which the figure is a perspective view of an ordinary wheeled cultivator.

In the drawing, the right wheel is detached, as also the shovels, and to the drag-bars of which my rotary harrow is attached. In the device shown it is designed to have two rotary harrows. The one on the right side, however, is omitted in the drawing.

A represents one of the wheels of the cultivator; B, the arched frame; C, the tongue; D D, the drag-bars, and E E the plow-handles attached thereto.

F represents a bar, preferably of wood, and usually about eight feet in length, which is bolted or otherwise fastened to the rear ends of the drag-bars D D.

At each end of the bar F, I attach my rotary harrows. The shaft $a$ passes vertically through the bar F, its lower end having the arms $b\ b\ b\ b$, with the harrow-teeth $c$ attached to the lower surface. As many harrow-teeth may be used as desired, and the form or shape may be varied. The upper end of shaft $a$ has its bearing in box $d$; or any other suitable bearing may be used to permit its rotation. Shaft $e$ is longitudinally suspended in suitable bearings in box $d$ and standard $f$ above bar F, so as to permit its rotation. At the outer end of shaft $e$ is fitted pinion $g$, which engages with pinion $h$ on shaft $a$, both being beveled, so as to form beveled gearing.

At the inner end of shaft $e$ is fitted the spur-wheel $i$. Around the hub of wheel A is fitted a larger spur-wheel, sometimes called a "sprocket-wheel," $j$, which is fastened to the spokes of wheel A by clip screw-bolts and nuts, or other equivalent means, so that the spur-wheel $j$ will rotate with wheel A. An endless chain, $k$, having the usual holes or orifices, in which the spurs upon the wheels may engage, is passed around spur-wheels $i$ and $j$. At the opposite end of bar F, I construct a similar rotary harrow, reversing it so the harrow-arms will be nearest the end of bar F, and also on the right wheel of the cultivator-frame I attach a similar spur-wheel, $j$, and also use an endless chain, as previously described, to transmit the power to the rotary harrow.

Corn is usually planted in rows four feet apart, and in planting with a corn-planter the rows are usually left slightly depressed, so that water stands therein some time after a rain, and the action of the sun thereon causes the earth to bake or harden, and it is with difficulty that the corn-plants come through. I therefore usually construct my device so that the rotary harrows are about eight feet apart, so that each harrow will work over one of the corn-rows. I do not, however, confine myself to this construction, for, as will readily be seen, I can use one or two rotary harrows, and can locate them any distance apart when I use two, or when using one at any distance along said bar F. So, too, I can use my device for cultivating between rows and for other plants.

The rotation of wheel A causes the endless chain $k$ to rotate the spur-wheel $i$, which in turn rotates shaft $e$ and its pinion or beveled gearing, and causes the vertical shaft $a$ and its arms $b$ to rotate, and teeth $c$, entering the ground, pulverize and loosen the soil.

Having thus described my invention, what I claim, and desire to secure by Letters Patent, is—

One or more rotary harrows attached to the rear of drag-bars of a wheeled-cultivator frame, and rotated by means of an endless chain or belt passing therefrom around a secondary wheel or equivalent on the main wheel of the cultivator-frame, substantially as described and shown.

THEODORE MEYER.

Witnesses:
J. W. STEWART,
W. C. WARRINER.